United States Patent
Celo et al.

(10) Patent No.: US 9,991,966 B1
(45) Date of Patent: Jun. 5, 2018

(54) OPTICAL TRANSMITTER

(71) Applicants: Dritan Celo, Nepean (CA); Lukas Chrostowski, Vancouver (CA); Eric Bernier, Kanata (CA); Yun Wang, Kanata (CA)

(72) Inventors: Dritan Celo, Nepean (CA); Lukas Chrostowski, Vancouver (CA); Eric Bernier, Kanata (CA); Yun Wang, Kanata (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 0 days. days.

(21) Appl. No.: 15/400,483

(22) Filed: Jan. 6, 2017

(51) Int. Cl.
| | |
|---|---|
| H03M 1/00 | (2006.01) |
| H04B 10/54 | (2013.01) |
| G02B 6/293 | (2006.01) |
| G02F 1/01 | (2006.01) |

(52) U.S. Cl.
CPC ....... H04B 10/541 (2013.01); G02B 6/29343 (2013.01); G02F 1/011 (2013.01); *G02F 2001/0113* (2013.01); *G02F 2201/06* (2013.01); *G02F 2203/15* (2013.01)

(58) Field of Classification Search
CPC ... H04B 10/541; G02F 1/011; G02F 2203/15; G02F 2201/06; G02F 2001/0113; G02B 6/29343
USPC ............................ 341/134, 11, 137; 359/346
See application file for complete search history.

(56) References Cited

U.S. PATENT DOCUMENTS

| | | | | |
|---|---|---|---|---|
| 6,243,180 B1* | 6/2001 | Kanterakis | ........... | G02B 6/4215 398/86 |
| 8,340,478 B2* | 12/2012 | Popovic | ............. | G02B 6/12002 385/2 |
| 9,164,300 B2* | 10/2015 | Bernasconi | ............. | G02F 1/011 |
| 2015/0222089 A1* | 8/2015 | Jeong | ...................... | H01S 5/142 359/346 |

(Continued)

FOREIGN PATENT DOCUMENTS

| | | |
|---|---|---|
| CN | 104133336 A | 11/2014 |
| WO | 2013188592 A1 | 12/2013 |

OTHER PUBLICATIONS

Dubé-Demers et al., "On-Chip Multi-level Signal Generation using Cascaded Microring Modulator", IEEE Optical Interconnects Conference (OI), May 2016 (pp. 28-29).

(Continued)

*Primary Examiner* — Jean B Jeanglaude

(57) ABSTRACT

An optical transmitter including an optical waveguide and N microring resonators (MRRs) coupled to the optical waveguide is provided. In such an optical transmitter each of the N MRRs having a different coupling coefficient determining the amount of coupling to the optical waveguide, wherein N>1. In some embodiments, each of the N MRRs has a different spacing distance from the optical waveguide, wherein the coupling coefficient for each MRR is dependent on the spacing. In some embodiments the optical transmitter further includes an input for receiving N drive signals from a controller, each drive signal shifting the resonant wavelength of the corresponding MRR to control the optical power coupled in the corresponding MRR from the optical waveguide in which an optical signal propagates.

22 Claims, 6 Drawing Sheets

(56) References Cited

U.S. PATENT DOCUMENTS

2016/0103382 A1     4/2016   Liboiron-Ladouceur et al.
2016/0204868 A1     7/2016   Celo et al.

OTHER PUBLICATIONS

International Search Report dated Feb. 12, 2018 for corresponding International Application No. PCT/CA2017/051472 filed Dec. 6, 2017.

Zhang, F. et al., "Demonstration of a 3-bit digital-to-analog convertor based on silicon microring resonators", IEEE 11th International Conference on Group IV Photonics (GFP), Paris, France, Aug. 27-29, 2014.

* cited by examiner

OPTICAL TRANSMITTER

FIELD OF THE INVENTION

The present invention pertains to the field of communication networks, and in particular to optical transmitters and digital-to-analog converters (DACs).

BACKGROUND

Optical transmitters are widely used in communication networks. One such use is to replace the electrical cabling which transmits an analog signal that drives the transmission antenna of a mobile communication network. This is useful when the base station controller or other equipment that generates the radio frequency (RF) signals to be transmitted is located remotely from the transmission antenna.

It can be challenging to carry the analog signal over electrical cabling, due to the large weight and poor signal integrity of electrical cables. Therefore, the analog signal may be carried on an optical fiber using an optical carrier. This and similar arrangements are known as a radio-over-fiber (RoF) system or an RF-over-fiber system.

The analog signal used to drive the transmission antenna may be converted from digital signal by a DAC. For example, the digital signal may be converted to an analog signal using a digital-to-analog (D-to-A) modulator. In an optical transmitter, an optical carrier signal, typically produced by a continuous wave (CW) laser diode, is modulated to carry digital data encoded on the CW analog waveform by means of such a DAC.

However there is a demand for ever increasing speeds, and smaller footprints for such systems. Accordingly there is a need for an improved optical transmitter which can operate at high speeds. Photonic Integrated Circuits (PIC) technologies can provide high speed and small footprint.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In a first aspect of the present disclosure, there is provided an optical transmitter including an optical waveguide and N microring resonators (MRRs) coupled to the optical waveguide. In such an optical transmitter, the N (MRRs) are optically coupled to the optical waveguide through N regions, where N>1. Each of the N regions between the optical waveguide and each of the N MRRs provides a different coupling coefficient between the N MRRs and the optical waveguide. Accordingly each of the N MRRs has a different coupling coefficient determining the amount of coupling to the optical waveguide. In some embodiments, each of the N regions has a different spacing between the corresponding MRR and the optical waveguide such that the different coupling coefficients are determined by the different spacing. In some embodiments each MRR includes an electrode configured for receiving a corresponding one of N drive signals from a controller and for shifting a resonant wavelength of the corresponding MRR upon receiving the corresponding drive signal, to control coupling of an optical signal from the optical waveguide in which the optical signal propagates to the corresponding MRR in dependence upon the corresponding drive signal. In some embodiments the optical transmitter further includes the controller. In some embodiments the controller is configured to produce the N drive signals for shifting the resonant wavelength of each of the N MRRs separately to control a portion of the optical signal coupled into each MRR from the optical waveguide in which an optical signal propagates. In some embodiments the controller has an interface for receiving a digital signal to be converted to an analog optical signal carried by the optical signal in the waveguide, and the controller is configured to produce the N drive signals to control the portions of the optical signal coupled at the corresponding MRRs independence upon the received digital signal. In some embodiments the controller is configured to modulate the optical signal in the waveguide with $2^N$ optical power levels dependent on the received digital signal. In some embodiments N=4 and the controller is configured to produce 4 drive signals representing 16 optical power levels to be applied to the optical signal in the optical waveguide. In some embodiments the digital signal includes 4-bits/symbol to be modulated onto the optical signal and each of the 16 optical power levels represents a symbol. In some embodiments the optical signal in the optical waveguide is at a first wavelength, the N MRRs are configured to resonate at a resonant wavelength proximate the wavelength, and the controller is configured to produce a drive signal to shift the resonant wavelength of each of the N MRRs with respect to the first wavelength to achieve a pre-determined value of the analog signal. In some embodiments the N MRRs are coupled to the optical waveguide in series. In some embodiments the optical waveguide is a bus waveguide. In some embodiments the first MRR has the largest coupling coefficient, representing the most significant bit and the last MRR has the smallest coupling coefficient representing the least significant bit. In some embodiments the first MRR has the smallest spacing from the optical waveguide, and the last MRR has the largest spacing from the optical waveguide. In some embodiments the optical transmitter further includes an electrical interface to each MRR to provide resonant frequency shifting using direct current (DC) biasing of the MRR.

Another aspect of the disclosure provides a photonic circuit including an optical transmitter and a controller. In such a photonic circuit the optical transmitter includes an optical waveguide and N microring resonators (MRRs) coupled to the optical waveguide; each of the N MRRs having a different spacing to the optical waveguide, wherein N>1. Embodiments will be discussed with reference to a single optical transmitter and controller, but it should be appreciated that a plurality of optical transmitters and controllers can be implemented in a single photonic chip. In some embodiments the different spacing produces a different amount of coupling between each of the MRRs and the optical waveguide. In some embodiments each MRR includes an electrode configured for receiving a corresponding one of N drive signals from the controller and for shifting a resonant wavelength of the corresponding MRR upon receiving the corresponding drive signal, to control resonant coupling of an optical signal from the optical waveguide in which the optical signal propagates to the corresponding MRR in dependence upon the corresponding driving signal. In some embodiments the controller receives a digital signal to be modulated on the optical signal, and the controller coverts the digital signal into the N drive signals dependent on the digital signal. In some embodiments the controller is configured to produce the N drive signals for shifting the resonant wavelength of each of the N MRRs separately to control a portion of the optical signal coupled into each MRR from the optical waveguide. In some embodiments the optical signal in the optical waveguide is at a first wavelength, the N MRRs are configured to resonate at a resonant wavelength proximate the first wavelength, and the controller is configured to produce a drive signal to shift the resonant wavelength of each of the N MRRs with respect to the first wavelength to achieve a pre-determined value of the digital signal. In some embodiments the controller is configured to modulate the optical signal in the optical waveguide with $2^N$ optical power levels dependent on the received digital signal. In some embodiments N=4 and the controller is configured to produce 4 drive signals representing 16 optical power levels to be applied to the optical signal in the optical waveguide. In some embodiments the digital signal includes 4-bits/symbol to be modulated onto the optical signal and each of the 16 optical power levels represents a symbol. In some embodiments the optical waveguide is a bus waveguide.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

A ring resonator (RR), also referred to as a microring resonator (MRR), is a waveguide ring which can optically couple with another waveguide. Examples will be discussed for a 4 ring device implemented in silicon on insulator (SOI), but it should be appreciated that N rings can be used, with N>1 and other materials with suitable optical properties can be used.

Figure 1:
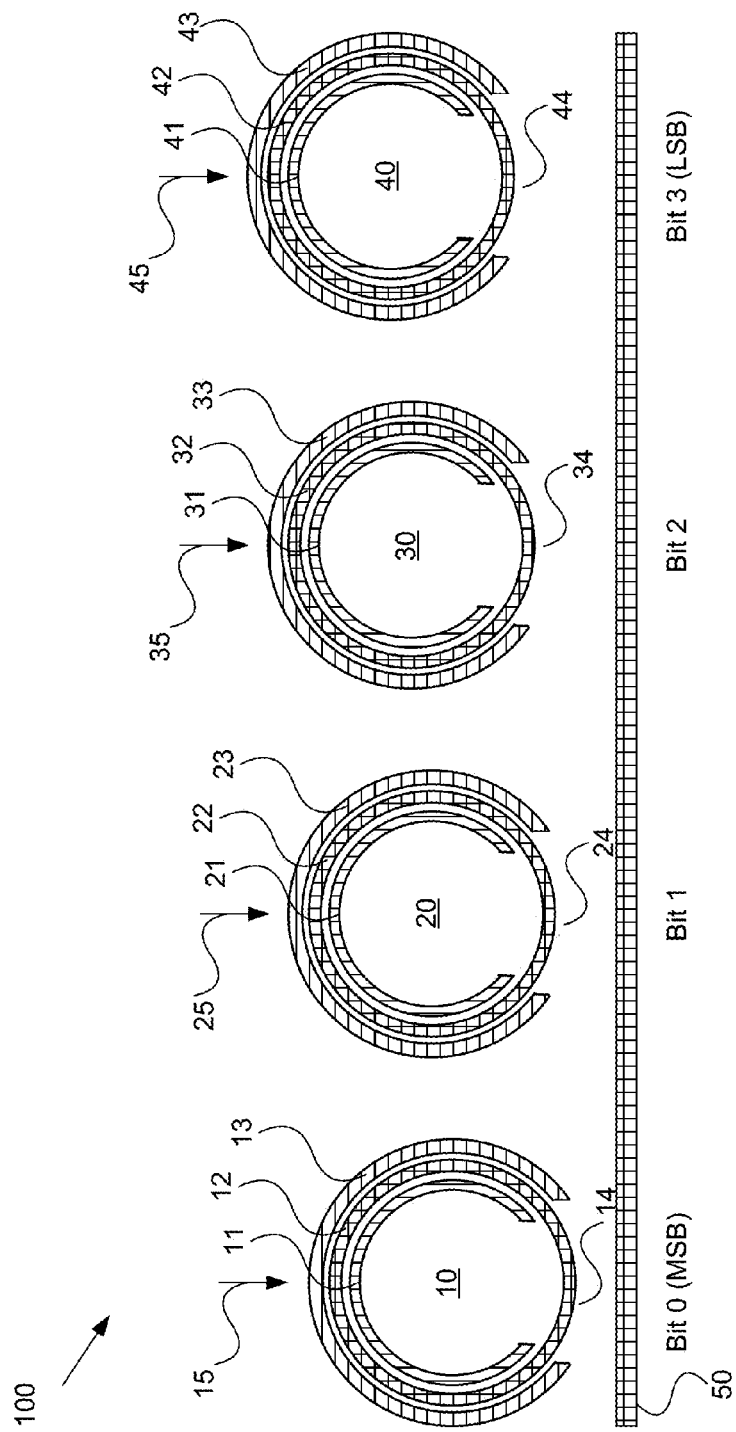
FIG. 1 illustrates a 4 ring DAC in accordance with embodiments of the present invention.

FIG. 1 illustrates a 4 ring optical transmitter in accordance with embodiments of the present invention. The optical transmitter includes a DAC, which includes MRRs which modulate an optical signal based on a digital input signal, and accordingly convert the digital input signal into an analog data signal carried by the optical signal. Although examples will be discussed with reference to a DAC, it should be appreciated that the devices discussed herein can also be considered digital-to-analog modulators, as the devices modulate an optical signal with digital information.

DAC 100 includes RR 10, RR 20, RR 30 and RR 40 each coupled in series to a waveguide 50. Waveguide 50 can be a bus waveguide. Each RR includes a pair of electrodes for shifting the resonant frequency of the ring, and an input interface for receiving a drive signal for driving the electrodes. Resonant frequency shifting in the RRs can be provided by an electro-optic effect (e.g., carrier injection) or thermo-optic effect. In an embodiment, a thermo-optic effect based resonant frequency shifting can be provided in addition to the electro-optic effect and implemented using direct current (DC) biasing of the RRs. Accordingly, Ring 1 (RR 10) includes ring waveguide 12, and input 15 for receiving a driving signal to activate electrodes 11 and 13. Similarly, Ring 2 (RR 20) includes ring waveguide 22, and input 25 for receiving a driving signal to activate electrodes 21 and 23. Further, Ring 3 (RR 30) includes ring waveguide 32, and input 35 for receiving a driving signal to activate electrodes 31 and 33. Ring 4 (RR 40) includes ring waveguide 42, and input 45 for receiving a driving signal to activate electrodes 41 and 43. Each ring may be configured to resonate at a same resonance wavelength. However each ring has a different coupling coefficient providing a different amount of coupling to the optical waveguide, and thus providing a different power modulation to the optical signal in waveguide 50. In other words, the different coupling coefficients cause the different rings to impinge different amplitude changes on the optical signal in the waveguide 50. In the embodiment shown, different coupling coefficients are implemented by having each region between the waveguide 50 and the corresponding ring having a different spacing from the waveguide 50; accordingly RR 10 has a first spacing 14, RR 20 has a second spacing 24, RR 30 has a first spacing 34, and RR 40 has a fourth spacing 44. Different coupling may also be implemented, for example, by varying refractive index of material in the regions 14, 24, 34, and 44.

In the embodiment illustrated, RR 10 modulates bit 0, which is the most significant bit (MSB), RR 20 modulates bit 1, RR 30 modulates bit 2 and RR 40 modulates bit 3, which is the least significant bit (LSB). RR 10 has the smallest spacing, which results in the largest coupling coefficient and hence provides the highest power modulation, and consequently provides the MSB. Whereas RR 40 has the largest spacing, which results in the smallest coupling coefficient, and hence provides the lowest power modulation, and consequently provides the LSB. As stated, each ring, with the different spacing, invokes a different optical power level dissipation on the optical signal in the waveguide 50. As such, the 4 ring modulator can impinge $2^4$=16 different optical power levels. As but one example, a 4-bit modulator could apply an optical power unit (p.u.) for each bit as follows: bit-0=16 p.u., bit-1=8 p.u., bit-2=4 p.u., and bit-3=2 p.u. While the embodiment illustrated implements different spacing to achieve different coupling coefficients, other embodiments can achieve the different coupling coefficients using other mechanisms, for example different refractive indices between the rings and the bus waveguide. In such a case, the refractive index can be modified using electro-optic techniques, thermo-optic techniques or other methods.

Such a DAC can form part of an optical transmitter. As should be appreciated, transmitted signals are sent through an optical fiber link to a receiver at the end of the link. The receiver includes a photodetector for detecting the analog signal. Such a receiver can reconstruct the digital data modulated on the signal by the DAC based on the 16 different power levels encoded on the signal. For example, demodulation can be performed by directly detecting the power level of the carrier at every symbol period. Alternatively, the detected signal may be directly amplified and transmitted over a radio frequency channel, or modulated onto a radio-frequency signal and then transmitted.

Figure 2:
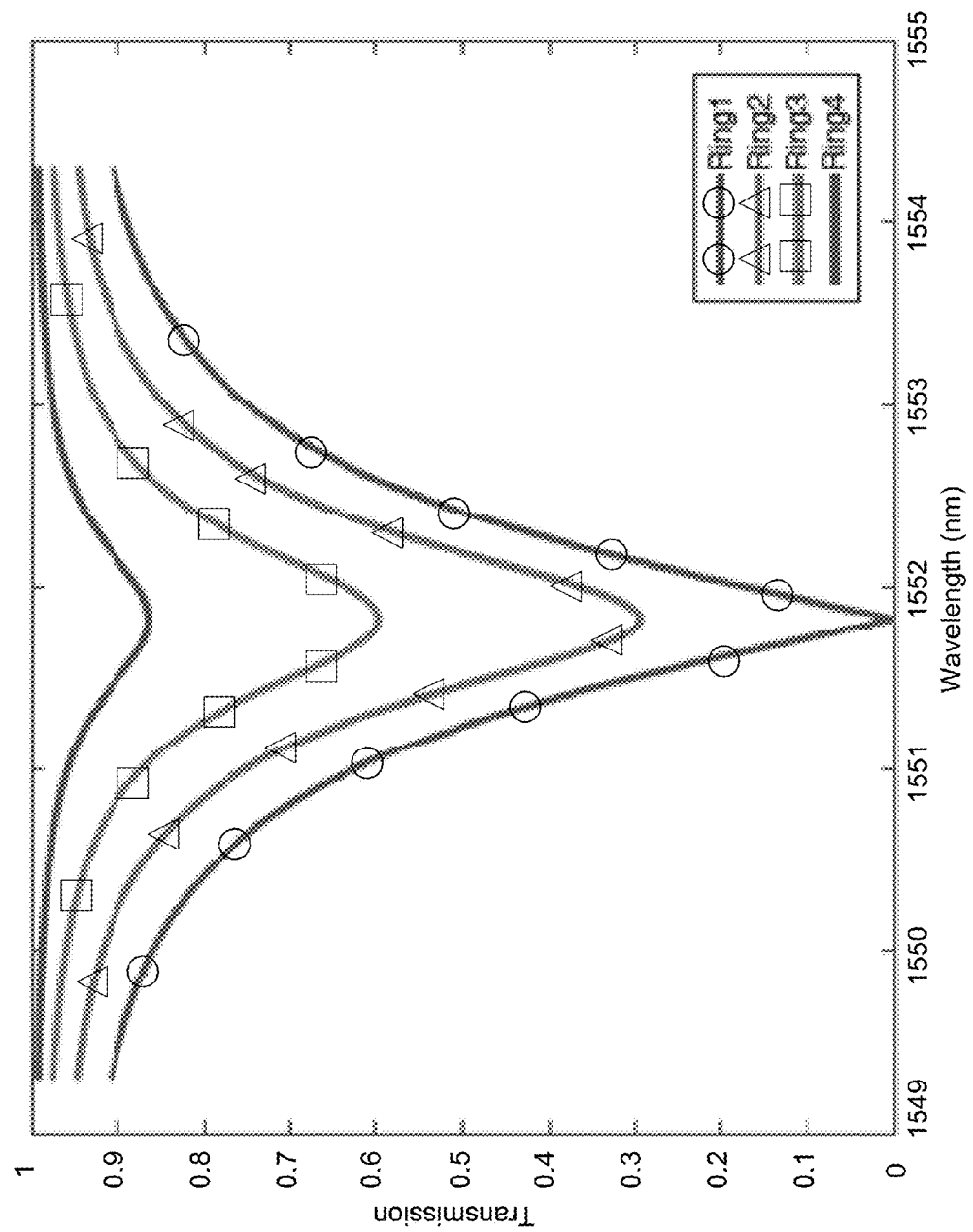
FIG. 2 illustrates example waveforms for each ring of FIG. 1 in accordance with embodiments of the present invention.
Figure 3:
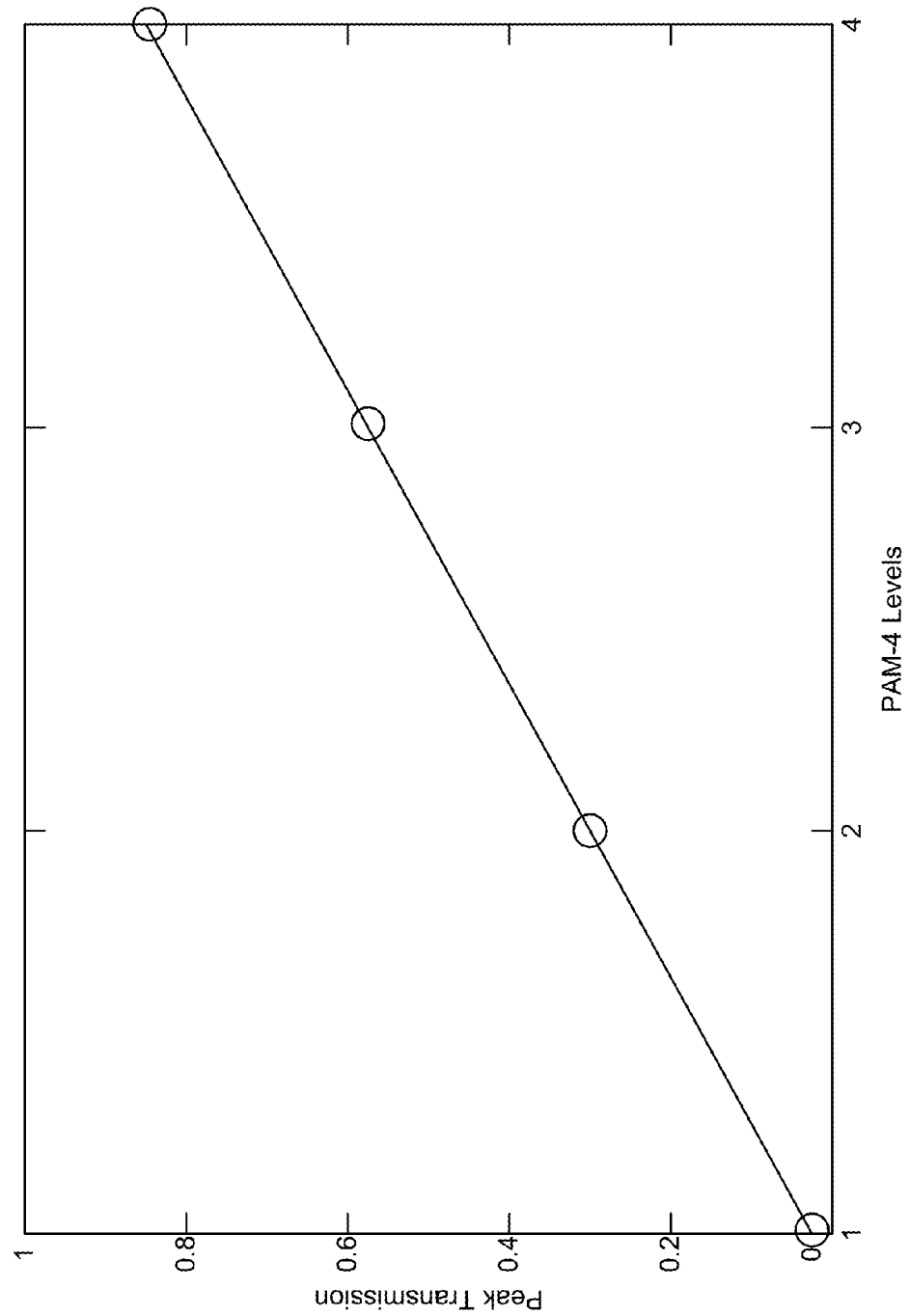
FIG. 3 illustrates the peak transmission power for pulse amplitude modulation (PAM) 4 in accordance with embodiments of the present invention.

FIG. 2 illustrates example waveforms for each ring of FIG. 1 in accordance with embodiments of the present invention. FIG. 2 illustrates example transmission spectra of four different ring resonators. As can be seen, the different non-resonant coupling coefficients provide 4 different levels of optical power, while wavelength-variable resonant coupling exhibits an inverted bell-shaped spectral response. The example shows rings which operate at the same resonant frequency, although in one embodiment, different rings may have different resonant frequencies. FIG. 3 illustrates the peak transmission power for pulse amplitude modulation (PAM) 4 in accordance with embodiments of the present invention.

Figure 4:
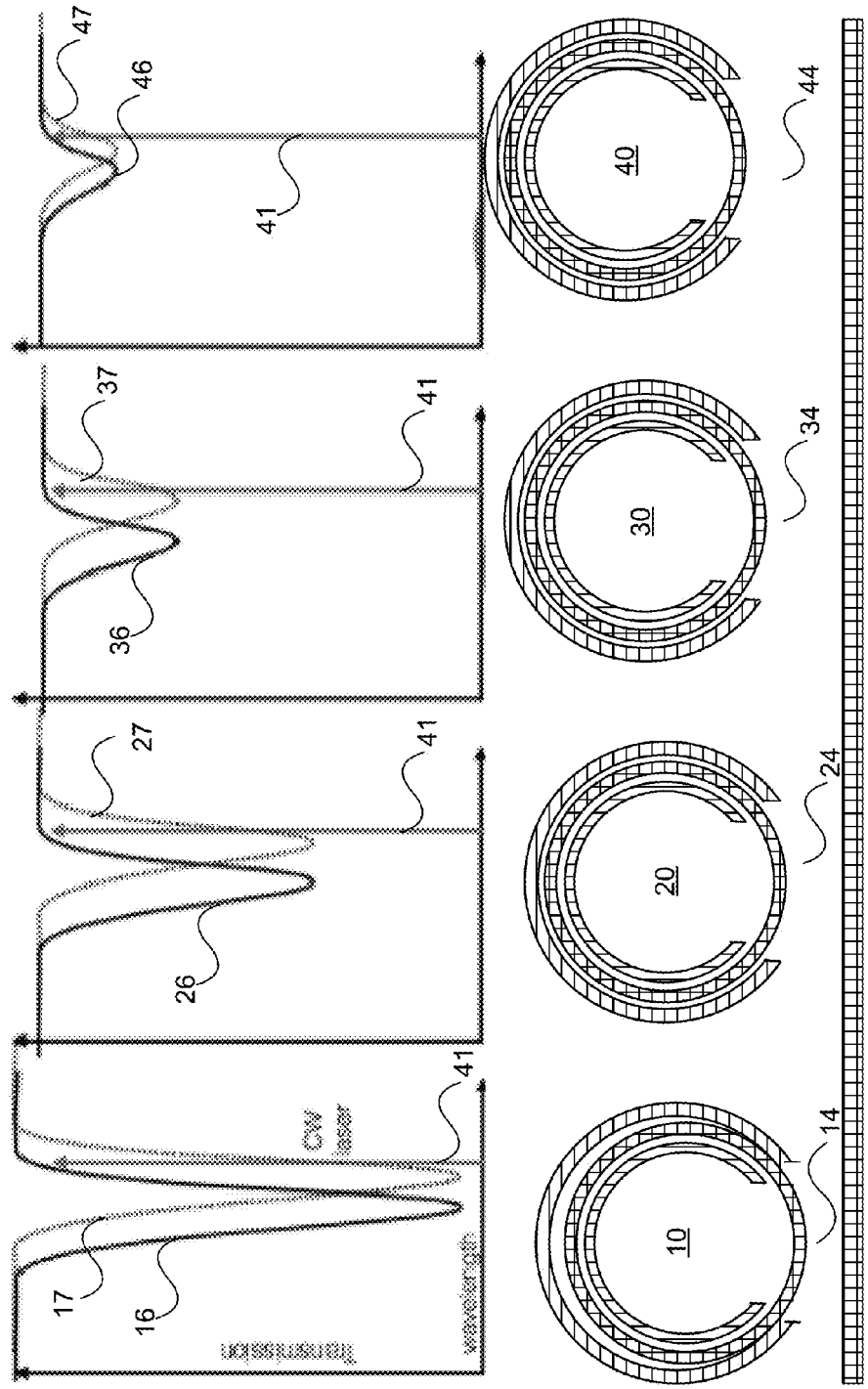
FIG. 4 illustrates example waveforms for each ring of FIG. 1 both in the resonant and non-resonant states, in accordance with embodiments of the present invention.

FIG. 4 illustrates example optical transmission spectra for each ring 10, 20, 30, and 40 of FIG. 1 both before and after application of the corresponding drive signal, in accordance with embodiments of the present invention. The transmission spectra are taken between locations on the waveguide 50 before and after respective gaps 14, 24, 34, and 44. FIG. 4 illustrates an example of how the drive signal applied to each ring 10, 20, 30, and 40 shifts the optical transmission spectrum of each ring 10, 20, 30, and 40. For each ring 10, 20, 30, and 40, the respective solid spectral lines 16, 26, 36, and 46 illustrate the optical transmission spectrum with the drive signal applied, and the respective dotted spectral lines 17, 27, 37, and 47 illustrate the optical transmission spectrum without the drive signal applied. The vertical arrow 41 indicates wavelength of light propagating in the bus waveguide 50. As seen in FIG. 4, when the drive signals are applied, the corresponding transmission spectra of the rings 10, 20, 30, and 40 shift so as to increase optical transmission of the rings 10, 20, 30, and 40. In other embodiments, the wavelength of light indicated by the arrow 41, termed herein "first wavelength", can be selected such as to decrease optical transmission of the rings 10, 20, 30, and 40 upon application of the corresponding drive signals.

In general, the transfer function of $i^{th}$ micro ring resonator depends on time and bit state $T_i(t, B_i)$; where B could have two values (states) $B_i=[0,1]$. The transfer function of the system containing 4 cascaded micro ring resonators is the product of transfer function of each MRR:

$$T(t,B)=T_1(t,B_0)\cdot T_2(t,B_1)\cdot T_3(t,B_2)\cdot T_4(t,B_3)=\Pi^k_{i=1}T_i(t,B_i);$$

In some embodiments, the four MRR responses are dynamically combined, in phase, to produce a PAM-4 signal. In some embodiments, the desired transfer function of the system can be designed by minimizing the error function:

$$\epsilon=\Sigma^{2^k}_{i=1}[T(t,B)-T_{desired}(t,B)]$$

Where in the 4 ring example discussed, B can have 8 values (parameters) as the B value for each ring $B_0$-$B_3$ is either 1 or 0.

Figure 5:
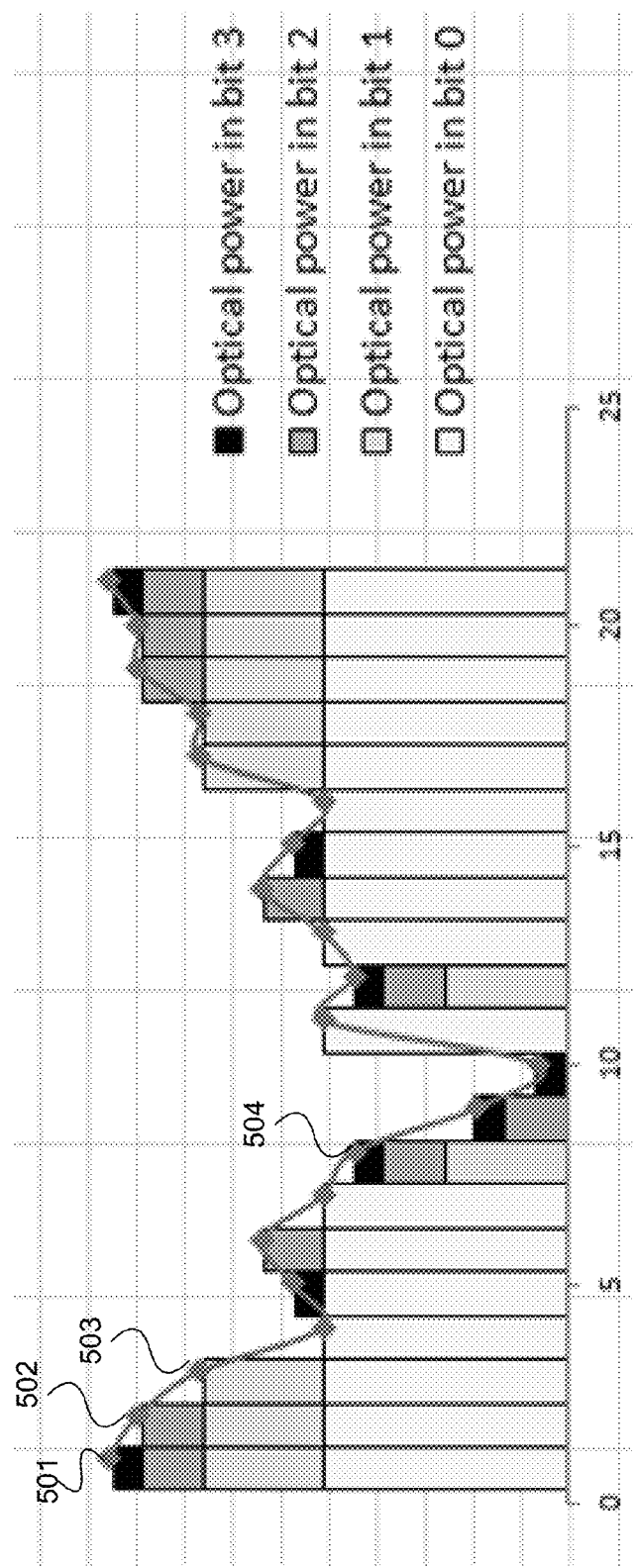
FIG. 5 illustrates an example optical power waveform, with each sampling point equal to the sum of the optical powers in each bit, in accordance with embodiments of the present invention.

FIG. 5 illustrates an example optical power waveform output from the DAC of FIG. 1, with each sampling point equal to the sum of the optical powers in each bit, in accordance with embodiments of the present invention. As discussed above, the four rings can each control the optical power for a bit. The controller is configured to produce the N drive signals for shifting the resonant wavelength of each of the N MRRs separately to control a portion of the optical signal coupled into each MRR from the optical waveguide. In this example there are 4 rings, corresponding to 4 bits.

The digital signal may be converted to an analog optical signal by modulating an optical carrier wave so that the optical power of the carrier wave corresponds to the magnitude of the digital signal. A light source provides an unmodulated optical carrier wave that can be modulated according to the digital signal. At a photo detector, the optical power at each sampling point presents the sum of transmitted power applied by each ring. Each ring will receive a drive signal which determines if it applies power for that bit value. For example at point 501, optical power is applied by all 4 rings (i.e., the drive signals are applied to provide power for each of bit 0, bit 1, bit 2 and bit 3, corresponding to rings 10, 20, 30 and 40 respectively). At point 502 power is applied in each of bit 0, bit 1 and bit 2, but not bit 3. For point 503 power is applied for bit 0 and bit 1, but not bit 2 or bit 3. Point 504 illustrates an example where power is applied for bit 1, bit 2 and bit 3, but not bit 0. A photodetector receiving the signal shown in FIG. 5 can determine the bit values in a conventional manner.

It should be appreciated that in the illustrated embodiments the difference in the coupling coefficient for each RR comes from the different spacing between each RR and the optical waveguide. The amount of optical coupling can be wavelength dependent. For each ring, there can be both resonant coupling (i.e., coupling at the resonant wavelength) and non-resonant coupling (coupling at non-resonant wavelengths). It should be appreciated that the different spacing can affect both resonant and non-resonant coupling. It should also be appreciated that the portion of the optical power in each ring may vary depending on wavelength.

Figure 6:
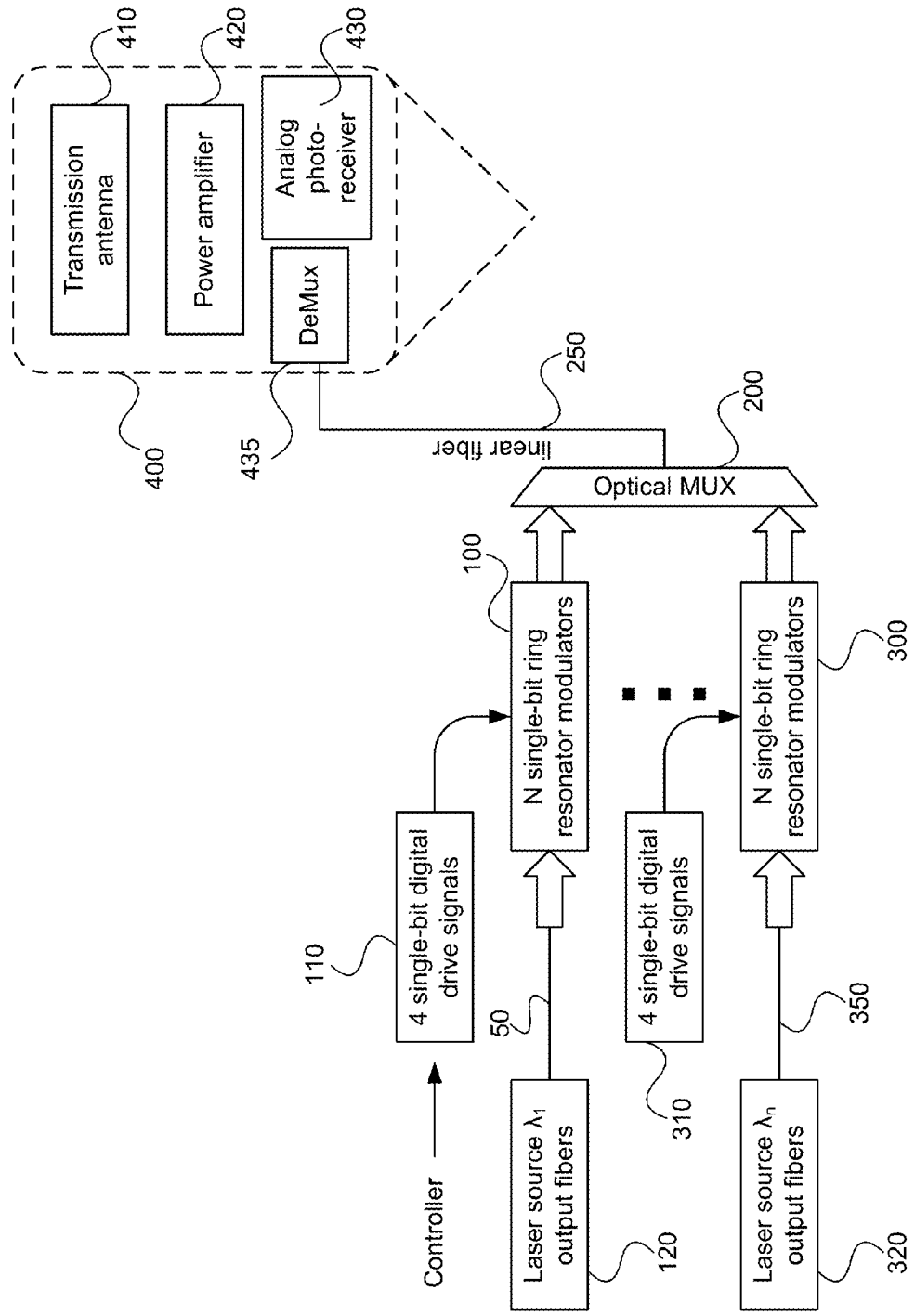
FIG. 6 illustrates an example communications network in accordance with embodiments of the present invention.

FIG. 6 illustrates an example communications network in accordance with embodiments of the present invention. FIG. 5 illustrates a plurality of optical transmitters, each operating at a wavelength, which produces a plurality of modulated signals which are mixed together by an optical multiplexer 200 and transmitted to a remote wireless cell tower 400 via an optical fiber 250. Wireless cell tower 400 includes an optical demultiplexer 435, a plurality of analog photo detectors, for example analog photodetector 430 which converts the received optical signal into radio frequency (RF) signals, a power amplifier 420 and a transmission antenna 410 for radiating the amplified RF signals. In the embodiment shown, there is an optical transmitter for each wavelength, and a corresponding photo detector (although only one is shown). A laser source 120 provides an unmodulated optical carrier signal at $\lambda_1$ onto waveguide 50. The optical signal can be modulated by DAC 100 according to the digital signal received at controller 110. The controller 110 receives a digital signal to be transmitted, and converts the signal into single bit drive signals to drive the rings of DAC 100. In the example shown controller 110 produces 4 single bit drive signals, as N=4 for the DAC 100. The additional transmitters (of which there can be n) will be of similar form: for example including laser source 320 provides an optical carrier signal at $\lambda_n$ onto waveguide 350 which is modulated by DAC 300 under which receive 4 single bit drive signals from controller 310. DAC 300 will be similar to DAC 100, but the RRs will be tuned to resonate at $\lambda_n$ rather than at $\lambda_1$.

It should be appreciated that for the above example, N=4 so 4 single bit drive signals are produced. However the controller is not limited to receiving digital words of 4 bits. Indeed as discussed, for N=4 (i.e., for 4 rings) there are 16 possible voltage combinations therefore creating 16 optical states in the resulting spectrum. Accordingly in some embodiments, the digital signal includes 4-bits/symbol be modulated onto the optical signal generating 16 optical power levels represents a bit of a 16 bit word. For example, the optical modulation format can be On-Off Keying (OOK), where the 1 is represented by the presence of the pulse while the 0 by the absence of a pulse.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. An optical transmitter comprising:
    an optical waveguide; and
    N microring resonators (MRRs) optically coupled to the optical waveguide through N regions; wherein each of the N regions between the optical waveguide and each of the N MRRs provides a different coupling coefficient between the N MRRs and the optical waveguide, wherein N>1.

2. The optical transmitter as claimed in claim 1 wherein each of the N regions has a different spacing between the corresponding MRR and the optical waveguide such that the different coupling coefficients are determined by the different spacing.

3. The optical transmitter as claimed in claim 2 wherein each MRR comprises an electrode configured for receiving a corresponding one of N drive signals from a controller and for shifting a resonant wavelength of the corresponding MRR upon receiving the corresponding drive signal, to control coupling of an optical signal from the optical waveguide in which the optical signal propagates to the corresponding MRR in dependence upon the corresponding drive signal.

4. The optical transmitter as claimed in claim 3 further comprising the controller configured to produce the N drive signals for shifting the resonant wavelength of each of the N MRRs separately to control a portion of the optical signal coupled into each MRR from the optical waveguide.

5. The optical transmitter as claimed in claim 4 wherein the controller has an interface for receiving a digital signal to be converted to an analog optical signal carried by the optical signal in the waveguide, and wherein the controller is configured to produce the N drive signals to control the portions of the optical signal coupled into the corresponding MRRs in dependence upon the received digital signal.

6. The optical transmitter as claimed in claim 5 wherein the controller is configured to modulate the optical signal in the waveguide with $2^N$ optical power levels dependent on the received digital signal.

7. The optical transmitter as claimed in claim 6, wherein N=4 and the controller is configured to produce 4 drive signals representing 16 optical power levels to be applied to the optical signal in the optical waveguide.

8. The optical transmitter as claimed in claim 7 wherein the digital signal includes 4-bits/symbol to be modulated onto the optical signal and each of the 16 optical power levels represents a symbol.

9. The optical transmitter as claimed in claim 4 wherein:
    the optical signal in the optical waveguide is at a first wavelength;
    the N MRRs are configured to resonate at a resonant wavelength proximate the first wavelength; and
    the controller is configured to produce a drive signal to shift the resonant wavelength of each of the N MRRs with respect to the first wavelength to achieve a predetermined value of the analog signal.

10. The optical transmitter as claimed in claim 1 wherein the N MRRs are coupled to the waveguide in series.

11. The optical transmitter as claimed in claim 10 wherein the first MRR has the largest coupling coefficient, representing the most significant bit, and wherein the last MRR has the smallest coupling coefficient representing the least significant bit.

12. The optical transmitter as claimed in claim 11 wherein the first MRR has the smallest spacing from the optical waveguide, and wherein the last MRR has the largest spacing from the optical waveguide.

13. The optical transmitter as claimed in claim 11 further comprising an electrical interface to each MRR to provide resonant frequency shifting using direct current (DC) biasing of the MRR.

14. A photonic circuit comprising:
    an optical transmitter; and
    a controller;
    wherein the optical transmitter comprises:
        an optical waveguide; and
        N microring resonators (MRRs) optically coupled to the optical waveguide; each of the N MRRs having a different spacing to the optical waveguide, wherein N>1.

15. The photonic circuit as claimed in claim 14 wherein the different spacing produces a different amount of coupling between each of the MRRs and the optical waveguide.

16. The photonic circuit as claimed in claim 15 wherein each MRR comprises an electrode configured for receiving a corresponding one of N drive signals from the controller and for shifting a resonant wavelength of the corresponding MRR upon receiving the corresponding drive signal, to control coupling of an optical signal from the optical waveguide in which the optical signal propagates to the corresponding MRR in dependence upon the corresponding driving signal.

17. The photonic circuit as claimed in claim 16 wherein the controller is configured to produce the N drive signals for shifting the resonant wavelength of each of the N MRRs separately to control a portion of the optical signal coupled into each MRR from the optical waveguide.

18. The photonic circuit as claimed in claim 17 wherein:
    the optical signal in the optical waveguide is at a first wavelength;
    the N MRRs are configured to resonate at a resonant wavelength proximate the first wavelength; and
    the controller is configured to produce a drive signal to shift the resonant wavelength of each of the N MRRs with respect to the first wavelength to achieve a predetermined value of the digital signal.

19. The photonic circuit as claimed in claim 18 wherein the controller is configured to modulate the optical signal in the optical waveguide with $2^N$ optical power levels dependent on the received digital signal.

20. The photonic circuit as claimed in claim 19, wherein N=4 and the controller is configured to produce 4 drive signals representing 16 optical power levels to be applied to the optical signal in the optical waveguide.

21. The photonic circuit as claimed in claim 20 wherein the digital signal includes 4-bits/symbol to be modulated onto the optical signal and each of the 16 optical power levels represents a symbol.

22. The photonic circuit as claimed in claim 14 wherein the optical waveguide is a bus waveguide.

* * * * *